United States Patent
Butterworth et al.

(10) Patent No.: US 8,341,458 B2
(45) Date of Patent: Dec. 25, 2012

(54) CONTROLLING DATA CONSISTENCY GUARANTEES IN STORAGE APPARATUS

(75) Inventors: Henry E. Butterworth, Hampshire (GB); Carlos F. Fuente, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 1746 days.

(21) Appl. No.: 11/181,492

(22) Filed: Jul. 14, 2005

(65) Prior Publication Data
US 2006/0015507 A1 Jan. 19, 2006

(30) Foreign Application Priority Data

Jul. 17, 2004 (GB) .................................. 0416074.3

(51) Int. Cl.
*G10F 11/00* (2006.01)
(52) U.S. Cl. ......... 714/6.3; 714/707; 707/622; 707/656; 707/662; 711/111; 711/203
(58) Field of Classification Search ............... 714/6, 7, 714/3.6, 707; 709/225; 711/111, 203; 707/622, 707/656, 662
See application file for complete search history.

(56) References Cited

U.S. PATENT DOCUMENTS

| | | | |
|---|---|---|---|
| 6,016,500 A * | 1/2000 | Waldo et al. ................. | 707/202 |
| 6,148,383 A | 11/2000 | Micka et al. | |
| 6,243,716 B1 * | 6/2001 | Waldo et al. ................. | 707/202 |
| 6,263,350 B1 * | 7/2001 | Wollrath et al. .............. | 707/206 |
| 6,519,615 B1 * | 2/2003 | Wollrath et al. .............. | 707/206 |
| 6,539,462 B1 | 3/2003 | Mikkelsen et al. | |
| 6,728,737 B2 * | 4/2004 | Wollrath et al. .............. | 707/206 |
| 6,760,736 B2 * | 7/2004 | Waldo et al. ................. | 707/206 |
| 6,789,161 B1 * | 9/2004 | Blendermann et al. ....... | 711/111 |
| 6,925,525 B2 * | 8/2005 | Blendermann et al. ....... | 711/111 |
| 2001/0000812 A1 * | 5/2001 | Waldo et al. ................. | 709/225 |
| 2002/0116383 A1 * | 8/2002 | Wollrath et al. .............. | 707/10 |
| 2004/0068636 A1 * | 4/2004 | Jacobson et al. ............. | 711/203 |
| 2004/0230879 A1 * | 11/2004 | Crosby ........................ | 714/718 |
| 2005/0207235 A1 * | 9/2005 | Blendermann et al. .. | 365/189.05 |

OTHER PUBLICATIONS

European search report in corresponding EP patent application 05104945.0, dated Mar. 19, 2012.

* cited by examiner

*Primary Examiner* — Bryce P Bonzo
*Assistant Examiner* — Jeison C Arcos
(74) *Attorney, Agent, or Firm* — Jennifer M. Anda

(57) ABSTRACT

An apparatus, method and computer program operable in a network controls consistency guarantees of a plurality of data copies in a storage apparatus, and includes: a lease control component for extending a lease to the storage apparatus; and a consistency freeze/thaw component responsive to a failure indication for initiating a consistency freeze action at the storage apparatus prior to expiration of the current group lease period. It may further include a timer component for waiting the apparatus for a predetermined period after the consistency freeze action, where the consistency freeze/thaw component is operable to initiate a thaw action at the storage apparatus.

20 Claims, 3 Drawing Sheets

CONTROLLING DATA CONSISTENCY GUARANTEES IN STORAGE APPARATUS

RELATED APPLICATIONS

The present patent application claims priority under 35 USC 119 to the previously filed United Kingdom (UK) patent application entitled "Controlling data consistency guarantees in storage apparatus," filed on Jul. 17, 2004, and assigned ser. no. 0416074.3.

FIELD OF THE INVENTION

The present invention relates to controlling data consistency guarantees in a storage apparatus, and more particularly to controlling data consistency guarantees in storage networks.

BACKGROUND OF THE INVENTION

Mirroring is a well-known technique for improving reliability of disk-based storage subsystems. Peer-to-Peer Remote Copy (PPRC), also known as Remote Copy or Remote Mirroring, is a form of mirroring in which one disk is maintained at a distance from the other, and which can be made accessible in the case of a failure of the first. This is used to provide continuing service in case of a disaster, or another failure that has a very large scope.

A challenge in providing PPRC is that of consistency. Applications often spread data across multiple disks. These disks may all be serviced by a single storage controller, but in a large configuration they may be distributed across multiple storage controllers. Related and interdependent applications running on multiple servers will also have their collective data spread across multiple disks. In order to make the entire set of disks at the remote site (usually called the "secondary") usable, a concept of consistency must be maintained. In short, the data at the secondary must correspond to data that might have been detected at the primary if a hypothetical power failure had halted I/O operations across all disks at a specific instant in the past.

Maintaining consistency across multiple storage controllers using today's conventional methods requires three components. First, a management application running on a highly reliable server that coordinates the consistency guarantee protocol is needed. Second, storage controllers each of which implements the consistency guarantee protocol are needed. Third, a highly reliable network connecting the server running the application with the multiple storage controllers is needed.

For organizations that do not have such hardware and networks, there remains a need to provide a fault-tolerant data consistency guarantee method that can run on lower-reliability servers connected by potentially failure-prone networks. In such networks, for example, one system may continue processing data mistakenly when a second system has already failed—this cannot be tolerated when the second system is intended to mirror the data on the first system. For this and other reasons, therefore, there is a need for the present invention.

SUMMARY OF THE INVENTION

Aspects of the present invention may include freeze-thaw elements and lease elements (elements designed to offer a system a time-limited license to act on data) combined together to provide a system for alleviating the problems of data inconsistency in networks having no network or system reliability guarantee, and in which there may be no robust central point of control.

In a first aspect, the present invention provides an apparatus operable in a network for controlling consistency guarantees of a plurality of data copies in a storage apparatus. The apparatus includes a lease control component for extending a lease to the storage apparatus, and a consistency freeze/thaw component responsive to a failure indication for initiating a consistency freeze action at the storage apparatus prior to expiration of the current group lease period.

The apparatus may further include a timer component for the apparatus to wait for a predetermined period after the consistency freeze action, where the consistency freeze/thaw component is operable to initiate a thaw action at the storage apparatus. The lease control component may operate lease heartbeat communications in the network. The lease component and a further lease component may cooperate to maintain operation in response to a single failure and to signal failure to the consistency freeze component in response to a multiple failure. The lease component may include a group lease component, and the network may be a storage area network. The lease control component may be located in the storage apparatus.

In a second aspect, the present invention provides a method of operating an apparatus in a network for controlling consistency guarantees of a plurality of data copies in a storage apparatus. A lease control component extends a lease to the storage apparatus. A consistency freeze/thaw component is responsive to a failure indication, and initiates a consistency freeze action at the storage apparatus prior to expiration of the current group lease period. Furthermore, the apparatus may wait, via a timer component, a predetermined period after the consistency freeze action. The consistency freeze/thaw component may also initiate a thaw action at the storage apparatus.

The lease control component may operate lease heartbeat communications in the network. The lease component and a further lease component may cooperate to maintain operation in response to a single failure and to signal failure to the consistency freeze component on a multiple failure. The lease component may include a group lease component, while the network may be a storage area network. The lease control component may be located in the storage apparatus.

In a third aspect, the present invention provides a computer program that includes computer program code to, when loaded into a computer system and executed thereon, perform the method according to the second aspect. In particular, the computer program may be implemented as a means within a computer-readable medium of an article of manufacture. Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
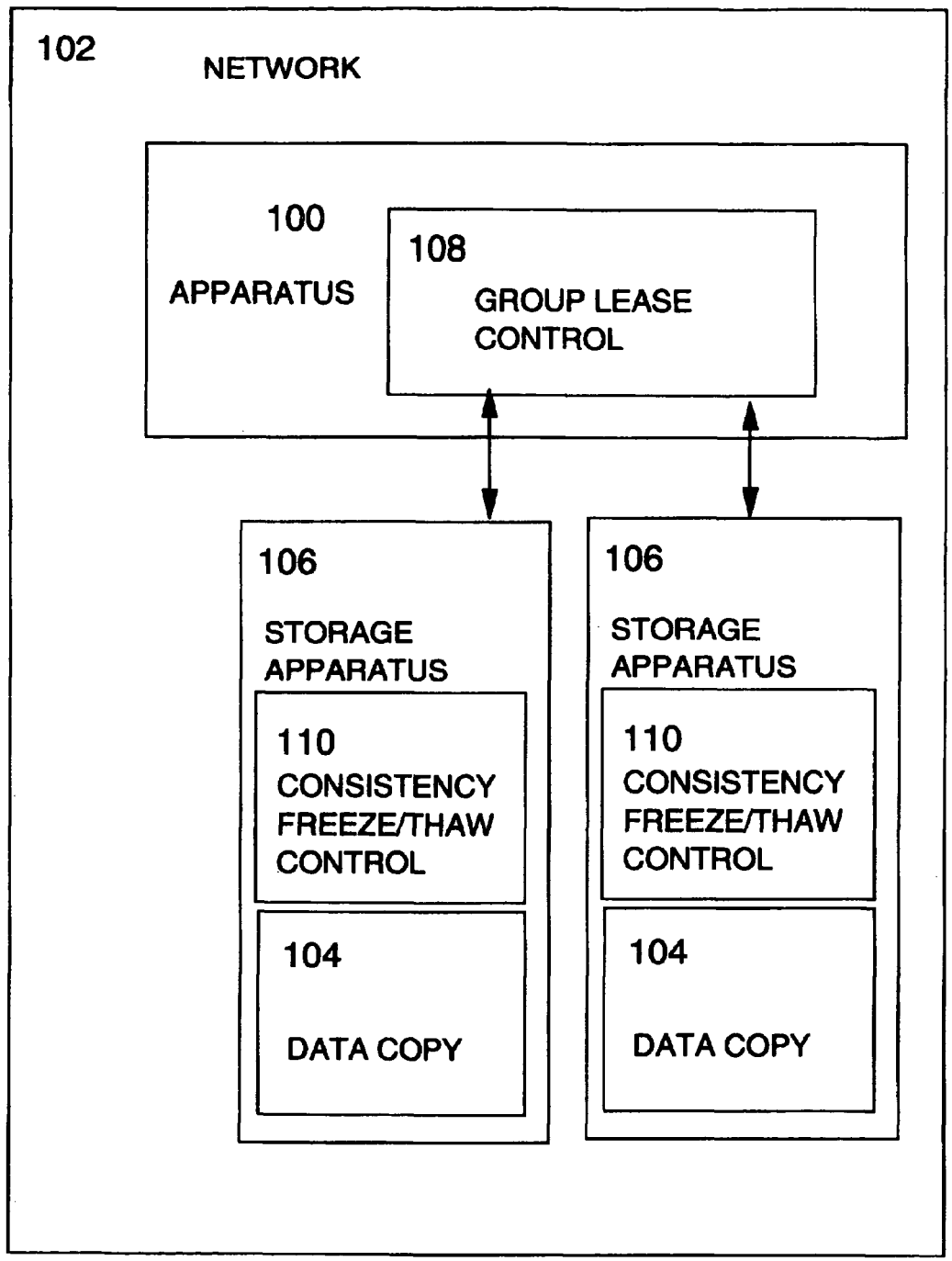
FIG. 1 shows in schematic form one type of apparatus in which the present invention may be embodied, according to an embodiment of the invention.

Turning to FIG. 1, there is shown a schematic diagram of an apparatus 100 operable in a network 102 for controlling consistency guarantees of a number of data copies 104 in storage apparatus 106. The apparatus includes a group lease control component 108 for operating group lease heartbeat communications in the apparatus 100. The apparatus further includes a consistency freeze/thaw component 110 responsive to a failure of a group lease heartbeat communications to initiate a consistency freeze action at the storage apparatus 106 prior to expiration of a current group lease period.

One embodiment of the present invention implements a group lease, which is a form of heartbeat message that ensures that consistency is correctly maintained in the face of arbitrary failures. Embodiments of the present invention allow for the use of multiple coordinating management servers, and multiple interconnecting networks, to maximize the likelihood of continuing operation even in the face of some failures, while maintaining the consistency guarantee in the face of very large number of failures.

In one embodiment of the present invention, a management node is "heart beating" (i.e., monitoring for "liveness") a set of storage apparatus, such as a set of storage controllers. The purpose of the heart beating is to ensure that the storage controllers perform a coordinated freeze-thaw if there is a partial or total communications network failure between the management node and the storage controllers, or between any of the storage controllers themselves.

Figure 2:
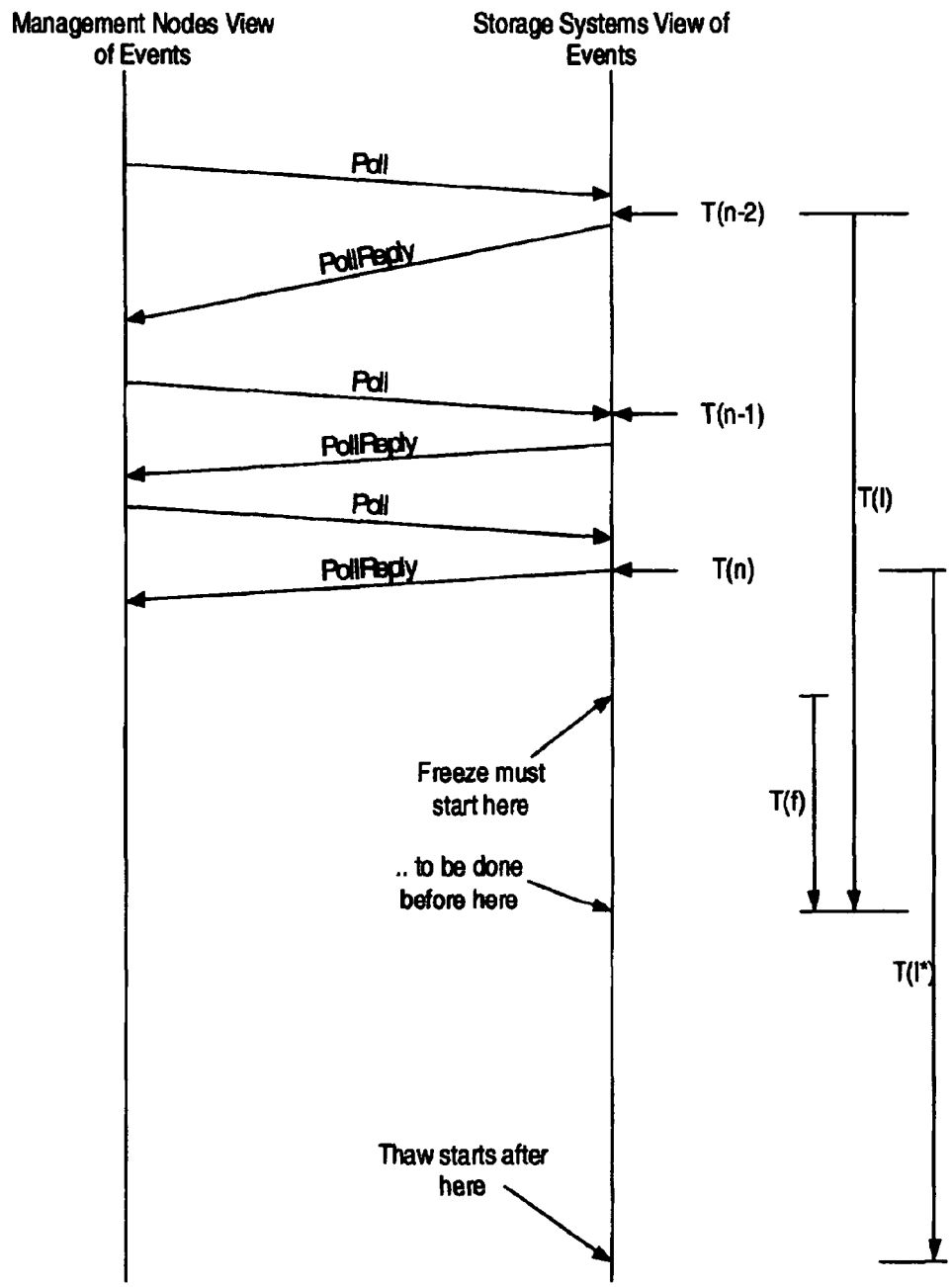
FIG. 2 shows a timing diagram for a simple 2-node lease logic arrangement, according to an embodiment of the invention.

The logic arrangement illustrated in FIG. 2 allows the controllers to perform a freeze-thaw without relying on any communications capability, but still ensure that freeze-thaw is coordinated across nodes so that consistency is maintained. The logic does not rely on the storage system clocks being synchronized, as this cannot necessarily be guaranteed over a potentially unreliable network. It does rely on the storage system clocks measuring time to within a defined error bar, such that given a time period T(1) measured on one node, a worst-case time period T(1*) can be calculated that will definitely be longer, when measured on another node. This worst-case time takes into account any possibility of varying clock rates (drifts), and jitter (large jumps caused perhaps by hang periods).

The logic arrangement illustrated in the timing diagram of FIG. 2 operates as follows. Each storage system is configured with an identical 'lease' time T(1). Each storage system is able to calculate its worst-case time T(1*) which is certain to be longer than T(1) measured on any other node. A management node polls all the storage systems every T(p) seconds. It waits for all the storage systems to reply, before issuing the next poll. That is, the poll always operates synchronously. Each storage system records the time at which it received each poll and it replied, using its own clock. The time stamp is taken after the poll is received, but before it transmits its response. The storage systems record the time of the last 3 polls. They are remembered as T(n−2), T(n−1) and T(n).

If communications are lost, such that the polling messages stop arriving after T(n), the controllers begin a freeze. They begin the freeze such that it is complete before T(n−2)+T(1). That is, the freeze must be carried out within the terms of the existing lease. This means that they start their freeze early enough to be certain it is complete by time T(f). They begin their thaw after T(n)+T(1*) time. This means that in this scenario they are frozen for at least T(n)−T(n−2)+T(*) time. This is approximately twice the polling period. It can be seen that the poll period must be such that 2T(p)<T(1). In fact, T(p) and T(1) must be chosen so as to ensure that the controllers get enough forewarning of the loss of communications, so that they can start their freeze in time to satisfy the timing constraint above.

Next, how the above method of operation solves the problem of coordinating consistency across a set of storage controllers is explained. This description begins by considering the abstract problem of coordination across a distributed system. The freeze time requirements of such systems are first described. A set of nodes can operate in one of 2 modes, A and B. They need to coordinate a transition from operating in mode A to operating in mode B so that all nodes perform this transition 'simultaneously'. They need to do this even where communications between the nodes fails, either partially or totally.

The definition of 'simultaneously' is clarified, since it is used in a special sense herein. In particular, what is described is how it is possible to tell that the transition happened simultaneously, and conversely, how it is possible to prove that the transition has not happened simultaneously. The operating mode of a node can only be perceived by an observer by sending a request message (REQ) to a node. The node will reply with a message indicating that it is operating in either Mode A (MDA) or Mode B (MDB).

The transmission of both REQ, and MDA/B might be delayed by the communications medium. A node is also permitted to delay sending a reply. Transmissions can cross or be reordered by the communications network. Hence, for an observer to test the transition of multiple nodes, and ensure that the MDx replies are received in the order of real world events, the observer has to wait for a preceding MDx message before attempting a new transmission. This ordering can be represented as follows:

REQ1→MDx1→REQ2→MDx2→REQ3→MDx3

→ indicates that the preceding message was received and triggered the transmission of the following message. Such an ordered set of request reply messages is described as being 'synchronous'.

The observer can observe the transition by observing the type of response (MDA or MDB) in such a synchronous sequence. If the transition is performed correctly, then an observer will just see a single transition (A,A,A,B,B,B), regardless of which node is tested with each question. The nodes will have failed to have transitioned simultaneously, if any observer ever sees a synchronous sequence with multiple transitions (AABABB).

If the observer overlaps the transmission of two REQs so the second is sent before the first's MDx is received, the sequence is asynchronous. The network delays and reordering make it impossible to infer anything by comparing the two MDx responses. The transition may have happened correctly even though a (BA) sequence is seen. In this specific case, the out-of-sequence A might have been delayed by the network.

For PPRC (Remote Copy) each node is a storage controller system. The two operating modes A, B, correspond respectively to the mode in which writes are mirrored to the destination, and to the mode where they are not. The observer corresponds to a host system. REQ corresponds to a write, or a read following a write which did not receive a successful completion. MDA indicates the write was mirrored, MDB indicates it was not. For consistency, a set of controllers has to transition from mirroring to non-mirroring mode simultaneously, so that all hosts, for any sequence of synchronous PPRC I/Os (with each I/O waiting for the completion of the preceding PPRC I/O), see a single transition from mirrored to non-mirrored writes.

This in turn means that, looking at the Remote Copy secondary, for any stream of synchronous I/O there will be a clean break in the I/O stream. Asynchronous I/Os (those which overlap) can be a mixture of mirrored or non-mirrored. The host system applications have to cope with an arbitrary mix of these appearing at the secondary following a consistency freeze.

In one embodiment of the present invention, a lease is used to coordinate activity after a failure in communications. A lease logic arrangement is useful in environments where responsibility for some critical system-wide function is delegated to a single node and that node is designated to act on behalf the entire system. For performance reasons the delegate node should not continually check with the rest of the system that everything is OK each time it performs the delegated function, but the delegate node has to stop operating within a guaranteed time if it is disconnected from the rest of the system.

In an exemplary simple 2-node system, with nodes A and B, A delegates some responsibility to B. A is said to extend a lease to B. B is then entitled to perform that responsibility for a certain bounded period (the lease period or $T(1)$ below). A can periodically extend the lease, such that B continues to perform the delegated service, so long as they stay in communication. If A stops renewing the lease, B is to stop performing the delegated service before the lease period expires. A and B are assumed each to contain a clock, with some minimum guarantee of quality, such that if B measures a time $T(1)$, and A measures a slightly larger time $T(1^*)$, then A will measure a longer time. A has to choose $T(1^*)$ to allow for differences in clock rates, and any jitter in measuring times.

One difficulty in coordinating clocks between or among systems is in agreeing when to start a timer. Network propagation delays are hard to predict, and particularly variable in error scenarios. A lease scheme avoids trying to measure the network propagation delay. Instead, it makes a conservative assessment of when to start a lease, by making sure that B starts its clock before A starts its clock. They are separated by a full network transmission delay.

Figure 3:
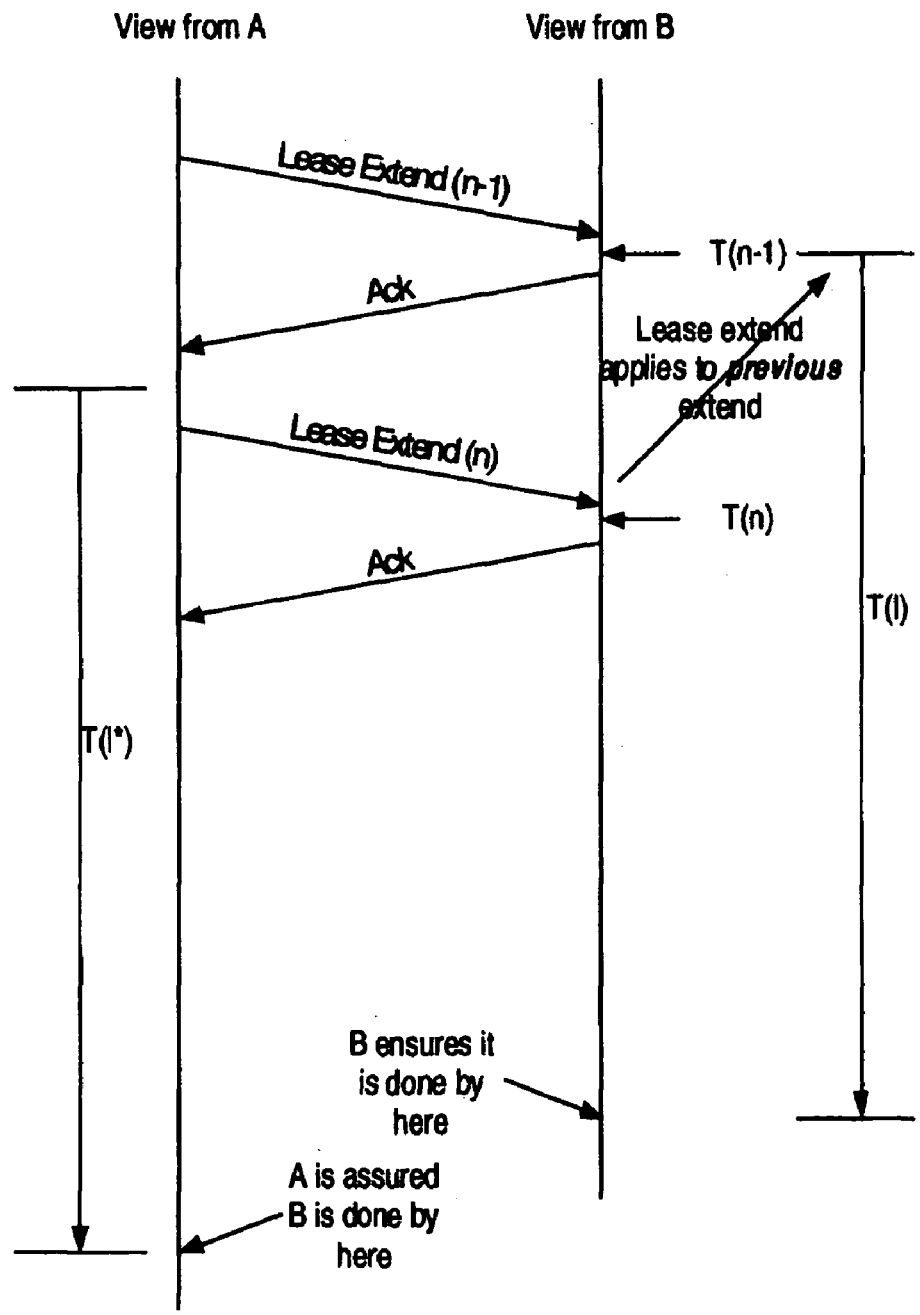
FIG. 3 shows a timing diagram for an extension to the lease logic arrangement of FIG. 2, according to an embodiment of the invention.

This is illustrated in FIG. 3, which operates as follows. B receives the message Lease Extend(n−1). The Lease Extend (n−1) message time of processing at B $T(n-1)$ is remembered. B then replies. When A receives an ACK, it notes the time of receipt. It sends the Lease Extend(n) message. The sending of this next Lease Extend means that A must assume that the lease is extended by $T(1^*)$. When B receives the message Lease Extend (n), it is now entitled to assume that the lease is extended till time $T(n-1)+T(1)$, that is, based on the previous Lease Extend message it received.

Thus, the sequence here is that, first, B starts timer, but this cannot be used until the next message is received. Second, B sends message to A. Third, A starts a corresponding timer. In this way, B's timer is certain to fire before A's.

For a group lease, a lease is to be implemented between every pair of nodes, in both directions between those nodes. It is possible to do this by using $2*n^2$ simple leases, but it is more efficient to follow the arrangement that is now described. The simplest way to make a group lease efficient makes use of a new node type, the collator. The collator broadcasts messages to all the nodes in the group, and receives replies from them. Hence, the collator enables communications between members of the group, without requiring the full N×N set of communications to be established (or even for all the members of the group to be aware of each other's identity).

The system begins with the collator sending out a QRYA message to each node in the group. This asks each node to reply ACK if it is operating in Mode A, or NACK if it is not operating in Mode A. If any node replies NACK, or fails to reply, the collator polls again some period later. If all nodes reply ACK, then the next time the collator sends out a polling message, it sends out an ALLA message, instead of QRYA. The nodes continue to reply ACK or NACK, according to their operating mode.

Each node in the group records the time before it transmits its reply (ACK or NACK). The time of transmission of the last 3 replies is retained. When a node without a lease receives a first ALLA message from the collator it is granted a lease for $T(1)$ seconds. The lease informs it that all nodes are operating in Mode A and will continue operating in this mode for at least $T(1)$ seconds. The reply to the first ALLA(0) message is recorded as $T(0)$. Subsequent messages are $T(1), T(2) \ldots T(n)$ etc.

As in the simple lease, the node uses a conservative reference for the start time for the lease. In the case of the first ALLA message received (at $T(0)$), it is the time $(T(-2))$ of the penultimate ACK that this node sent. This is the latest time reference that this node has, which is certain to be before the time that all the other nodes consider they granted the lease.

In effect, the collator is enabling N×N messages to be propagated between the members of the group. It takes two passes through the collator (each including ALLA and ACK replies), to cause a request and reply message to be sent from each node in the group to every other node in the group. This leads to the second-before-last transmission time being the reference point for the lease.

The node may continue to extend its lease. Each time the node receives an ALLA(n) message from the collator, it notes the time of transmitting its reply $T(n)$, and extends the lease to $T(n-2)+T(1)$. If a node fails to receive a message ALLA(n+1) before time $T(n-2)+T(1)$ is close to expiring, it makes a transition from operating in Mode A to operating in Mode B, simultaneously with the other nodes. To do this, the node first stops replying to newly arriving REQ messages (with either MDA or MDB). The node completes this stop before the lease has expired. This satisfies the terms of the lease the node has been extended by all its peers. That is, the node stops operating in mode A before its lease expires.

One issue is at what point this node can consider the lease it extended to all the other nodes to have expired. The node is to wait till $T(n)+T(1^*)$ to expire, since its last ACK may have extended another node's lease, even if this node failed to receive further lease extensions. As before, $T(1^*)$ denotes that $T(1)$ must be treated conservatively, allowing for clock jitter and constant rate drifts. After $T(n)+T(1^*)$, the node is assured that no other node holds a lease, and hence that no other node is operating in Mode A, and it can begin operating in Mode B itself.

The collator may be implemented as part of the PPRC Copy Manager function. QRYA is asking if all nodes are synchronized. ALLA denotes that all nodes are synchronized, and requests confirmation that all nodes are still synchronized. ACK denotes that a node is still synchronized. NACK denotes that a node is not still synchronized. For instance, the node may have suffered an I/O error. The collator has to issue ALLA messages sufficiently frequently to maintain the group lease. A continuous group lease is needed to prevent a loss of synchronization and require a background copy operation (with the associated loss of consistency).

Reliable maintenance of group lease means at least 2 rounds of ALLA/ACK messages are needed within T(1) time, allowing for worst-case propagation and processing delays, occasional retries and dropped packets, and the like, plus enough time to be certain to start and complete the freeze. In one embodiment, a single polling message can be used to manage a set of consistency groups, once they are all synchronized. If communications fail, then all consistency groups can freeze/thaw at the same time. The only complications arise when a single consistency group operates differently from the others. Suppose that on a particular controller a single consistency group suffers an I/O error. That group has to begin a freeze, and signal to the copy manager to perform a freeze/thaw. If the signal to the copy manager is lost, or the freeze/thaw never arrives, then the freeze will never end.

It is thus preferable to use an independent message for each consistency group. These can easily be grouped into a single message transmission/receipt, so that the QRYA, ALLA, ACK and NACK messages describe a list of consistency groups to which they apply. In such an arrangement, if a controller suffers an I/O error, it can stop ACKing that consistency group. This in turn means it will stop receiving ALLA messages for that group, and it can be certain that the freeze will end within T(1*) time. This scheme provides a way to make the group operation fault tolerant.

In one embodiment, two (or more) collators can be established, each maintaining a separate group lease with the same group of nodes. The nodes may continue operating in Mode A (synchronized) if either collator successfully maintains an ALLA sequence. Nodes fall to Mode B if both collators fail to maintain the sequence. This also occurs if any node suffers an I/O error. The second collator may be a completely separate node. It may use a completely parallel communications network. Also, the collator need not be a management node. Any of the nodes in the group can also be a collator. This embodiment requires each node to maintain multiple, completely separate leases, with multiple timings for each of the distinct sequences of ACKs it sends.

It will be clear to one skilled in the art that the method of the present invention may suitably be embodied in a logic apparatus comprising logic means to perform the steps of the method, and that such logic means may comprise hardware components or firmware components.

Furthermore, it will be appreciated that the method described above may also suitably be carried out fully or partially in software running on one or more processors, and that the software may be provided as a computer program element carried on any suitable data carrier such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A peer-to-peer storage system comprising:
    a plurality of peer-to-peer storage nodes, each peer-to-peer storage node storing a copy of data such that the copy of the data has a consistency guarantee across the peer-to-peer storage system in that regardless of which peer-to-peer storage node from which the copy of the data is retrieved, the copy of the data is identical;
    a consistency freeze/thaw component at each peer-to-peer storage node, responsive to an indication of a communication failure between any two peer-to-peer storage nodes of the plurality of peer-to-peer storage nodes, to initiate a consistency freeze action in which the copy of the data is maintain at a current state and is not permitted to change,
    wherein the consistency freeze action is initiated responsive to the indication of the communication failure prior to expiration of a current group lease period concerning at least the copy of the data,
    wherein the consistency freeze action is initiated by the consistency freeze/thaw component at each peer-to-peer storage node under a timing constraint related to local clocks at the peer-to-peer storage nodes without a common system clock of the peer-to-peer storage system as a whole,
    and wherein the timing constraint takes into account a worst-case time difference among the local clocks due at least to varying local clock rate drifts and local lock rate jitter.

2. The peer-to-peer storage system of claim 1, wherein the indication of the communication failure comprises a failure to receive a given polling message by a first peer-to-peer storage node of the plurality of peer-to-peer storage nodes from a second peer-to-peer storage node of the plurality of peer-to-peer storage nodes.

3. The peer-to-peer storage system of claim 2, wherein the current group lease period is related to a period T(p) at which polling messages are communicated among the peer-to-peer storage nodes.

4. The peer-to-peer storage system of claim 3, wherein the indication of the communication failure is a failure of the first peer-to-peer storage node to receive the given polling message from the second peer-to-peer storage node at a current polling time T(n),
wherein the timing constraint comprises that the consistency freeze action is initiated so that the consistency freeze action is completed before a polling time T(n−2) plus the current group lease period T(1),
and wherein the polling time T(n−2) is a polling time immediately prior to a polling time T(n−1) that is a polling time immediately prior to the current polling time T(n).

5. The peer-to-peer storage system of claim 4, wherein the timing constraint further comprises that the current group lease period T(1) is greater than two times the period T(p) at which the polling messages are communicated among the peer-to-peer storage nodes.

6. A peer-to-peer storage node of a peer-to-peer storage system including a plurality of peer-to-peer storage nodes including the peer-to-peer storage node, comprising:
a storage device to store a copy of data such that the copy of the data has a consistency guarantee across the peer-to-peer storage system in that regardless of which peer-to-peer storage node of the peer-to-peer storage system from which the copy of the data is retrieved, the copy of the data is identical;
a consistency freeze/thaw component, responsive to an indication of a communication failure between the peer-to-peer storage node and another peer-to-peer storage node of the peer-to-peer storage system, to initiate a consistency freeze action in which the copy of the data is maintain at a current state and is not permitted to change,
wherein the consistency freeze action is initiated responsive to the indication of the communication failure prior to expiration of a current group lease period concerning at least the copy of the data,
wherein the consistency freeze action is initiated by the consistency freeze/thaw component at the peer-to-peer storage node under a timing constraint related to local clocks at the peer-to-peer storage nodes without a common system clock of the peer-to-peer storage system as a whole,
and wherein the timing constraint takes into account a worst-case time difference among the local clocks due at least to varying local clock rate drifts and local lock rate jitter.

7. The peer-to-peer storage node of claim 6, wherein the indication of the communication failure comprises a failure to receive a given polling message by the peer-to-peer storage node from the another peer-to-peer storage node.

8. The peer-to-peer storage node of claim 7, wherein the current group lease period is related to a period T(p) at which polling messages are communicated among the peer-to-peer storage nodes.

9. The peer-to-peer storage node of claim 8, wherein the indication of the communication failure is a failure of the peer-to-peer storage node to receive the given polling message from the another peer-to-peer storage node at a current polling time T(n),
wherein the timing constraint comprises that the consistency freeze action is initiated so that the consistency freeze action is completed before a polling time T(n−2) plus the current group lease period T(1),
and wherein the polling time T(n−2) is a polling time immediately prior to a polling time T(n−1) that is a polling time immediately prior to the current polling time T(n).

10. The peer-to-peer storage system of claim 9, wherein the timing constraint further comprises that the current group lease period T(1) is greater than two times the period T(p) at which the polling messages are communicated among the peer-to-peer storage nodes.

11. A method comprising:
at each peer-to-peer storage node of a plurality of peer-to-peer storage nodes of a peer-to-peer storage system, storing a copy of data such that the copy of the data has a consistency guarantee across the peer-to-peer storage system in that regardless of which peer-to-peer storage node from which the copy of the data is retrieved, the copy of the data is identical; and
at each peer-to-peer storage node, responsive to an indication of a communication failure between any two peer-to-peer storage nodes of the plurality of peer-to-peer storage nodes, initiating a consistency freeze action in which the copy of the data is maintain at a current state and is not permitted to change,
wherein the consistency freeze action is initiated responsive to the indication of the communication failure prior to expiration of a current group lease period concerning at least the copy of the data,
wherein the consistency freeze action is initiated by the consistency freeze/thaw component at each peer-to-peer storage node under a timing constraint related to local clocks at the peer-to-peer storage nodes without a common system clock of the peer-to-peer storage system as a whole,
and wherein the timing constraint takes into account a worst-case time difference among the local clocks due at least to varying local clock rate drifts and local lock rate jitter.

12. The method of claim 11, wherein the indication of the communication failure comprises a failure to receive a given polling message by a first peer-to-peer storage node of the plurality of peer-to-peer storage nodes from a second peer-to-peer storage node of the plurality of peer-to-peer storage nodes.

13. The method of claim 12, wherein the current group lease period is related to a period T(p) at which polling messages are communicated among the peer-to-peer storage nodes.

14. The method of claim 13, wherein the indication of the communication failure is a failure of the first peer-to-peer storage node to receive the given polling message from the second peer-to-peer storage node at a current polling time T(n),
wherein the timing constraint comprises that the consistency freeze action is initiated so that the consistency freeze action is completed before a polling time T(n−2) plus the current group lease period T(1),
and wherein the polling time T(n−2) is a polling time immediately prior to a polling time T(n−1) that is a polling time immediately prior to the current polling time T(n).

15. The method of claim 14, wherein the timing constraint further comprises that the current group lease period T(1) is greater than two times the period T(p) at which the polling messages are communicated among the peer-to-peer storage nodes.

16. An article of manufacture for a peer-to-peer storage node of a peer-to-peer storage system including a plurality of peer-to-peer storage nodes including the peer-to-peer storage node, comprising:
  a non-transitory computer-readable medium; and
  means in the medium for, responsive to an indication of a communication failure between the peer-to-peer storage node and another peer-to-peer storage node of the peer-to-peer storage system, initiating a consistency freeze action in which the copy of the data is maintain at a current state and is not permitted to change,
  wherein the consistency freeze action is initiated responsive to the indication of the communication failure prior to expiration of a current group lease period concerning at least the copy of the data,
  wherein the consistency freeze action is initiated by the consistency freeze/thaw component at the peer-to-peer storage node under a timing constraint related to local clocks at the peer-to-peer storage nodes without a common system clock of the peer-to-peer storage system as a whole,
  wherein the timing constraint takes into account a worst-case time difference among the local clocks due at least to varying local clock rate drifts and local lock rate jitter,
  and wherein the peer-to-peer storage node is to store a copy of data such that the copy of the data has a consistency guarantee across the peer-to-peer storage system in that regardless of which peer-to-peer storage node of the peer-to-peer storage system from which the copy of the data is retrieved, the copy of the data is identical.

17. The article of manufacture of claim 16, wherein the indication of the communication failure comprises a failure to receive a given polling message by the peer-to-peer storage node from the another peer-to-peer storage node.

18. The article of manufacture of claim 17, wherein the current group lease period is related to a period T(p) at which polling messages are communicated among the peer-to-peer storage nodes.

19. The article of manufacture of claim 18, wherein the indication of the communication failure is a failure of the peer-to-peer storage node to receive the given polling message from the another peer-to-peer storage node at a current polling time T(n),
  wherein the timing constraint comprises that the consistency freeze action is initiated so that the consistency freeze action is completed before a polling time T(n−2) plus the current group lease period T(1),
  and wherein the polling time T(n−2) is a polling time immediately prior to a polling time T(n−1) that is a polling time immediately prior to the current polling time T(n).

20. The article of manufacture of claim 19, wherein the timing constraint further comprises that the current group lease period T(1) is greater than two times the period T(p) at which the polling messages are communicated among the peer-to-peer storage nodes.

* * * * *